United States Patent [19]
Siegel

[11] Patent Number: 5,927,234
[45] Date of Patent: Jul. 27, 1999

[54] ANIMAL RESTRAINING METHOD

[75] Inventor: Daniel M. Siegel, 33 Hitherbrook Rd., St. James, N.Y. 11794

[73] Assignee: Daniel M. Siegel, St. James, N.Y.

[21] Appl. No.: 08/927,355

[22] Filed: Sep. 12, 1997

[51] Int. Cl.[6] .................................................. A01K 29/00
[52] U.S. Cl. .......................................... 119/751; 119/417
[58] Field of Search .................................. 119/751, 417, 119/418, 702, 707

[56] References Cited

U.S. PATENT DOCUMENTS

| | | | |
|---|---|---|---|
| 2,471,701 | 5/1949 | Post ............................................ | 229/53 |
| 3,739,751 | 6/1973 | Mohr et al. . | |
| 4,137,870 | 2/1979 | Cano . | |
| 4,781,150 | 11/1988 | Phillips .................................... | 119/751 |
| 5,167,160 | 12/1992 | Hall, II ................................ | 73/864.91 |
| 5,230,304 | 7/1993 | Santoro .................................... | 119/751 |
| 5,320,069 | 6/1994 | Anderson, Jr. et al. ................ | 119/751 |
| 5,423,290 | 6/1995 | Payne ....................................... | 119/418 |
| 5,603,288 | 2/1997 | Ferber ...................................... | 119/751 |
| 5,655,484 | 8/1997 | Aaberg .................................... | 119/751 |
| 5,816,197 | 10/1998 | DeStefano et al. ..................... | 119/712 |

*Primary Examiner*—Jack W. Lavinder
*Assistant Examiner*—Yvonne R. Abbott
*Attorney, Agent, or Firm*—Darby & Darby

[57] ABSTRACT

An animal restraining device, in an exemplary embodiment comprising: a tube having a longitudinal extent and defining a first end, second end and interior chamber, the tube constructed and arranged for receiving a portion of the animal within the interior chamber to restrain the animal, the tube defining a peripheral wall and at least one aperture in the peripheral wall to enable access to the body of the animal restrained in the tube; and a method of restraining an animal to be tested.

2 Claims, 4 Drawing Sheets

ANIMAL RESTRAINING METHOD

BACKGROUND OF THE INVENTION

1. Field of the Invention

The present invention relates generally to animal restraining devices, and more particularly, to an animal restraining device for easily holding and providing access to the animal to enable testing to be implemented without harm to either the animal or test personnel, and a method of performing same.

2. Description of the Prior Art

Various devices are known in the art for restraining animals to facilitate testing of or injecting an animal without harm while minimizing the risk of biting or scratching test personnel and the consequent transfer of disease. In this regard, U.S. Pat. No. 5,167,160 discloses a positioning device for holding an animal during electromagnetic analysis. The apparatus comprises an elongated cylindrical tube having an open-ended, resilient inner sleeve member with a slit running lengthwise through the peripheral wall of the tube. An elongate constricting assembly is disposed around the inner sleeve member to engage and selectively apply radially inward compression against the inner sleeve member. The assembly is constructed from non-conductive materials to permit electromagnetic energy to pass therethrough with minimal attenuation. A rodent is placed within the sleeve to thereby restrain the same during testing. This arrangement does not provide a means of obtaining access to the body of the animal.

U.S. Pat. No. 2,471,701 discloses a poultry bag for restraining a chicken. The device includes a soft bag having a head opening at one end and a foot opening at an opposite end. The chicken is wrapped with the bag and a quick tying band is secured around the feet of the animal. The neck is tightly engaged with the head exposed to permit free breathing. There are no provisions in the bag for providing access to the body of the animal. Moreover, the mouth of the animal is exposed thereby creating a risk of biting a human.

U.S. Pat. No. 4,137,870 discloses a wrap-around animal restraint comprised of a pair of sheets cut so as to have a wide first end and narrower second end. The sheets are united along a common longitudinal edge and, at the wider end, at a portion along another longitudinal edge. In this manner, the wider end forms a bag with the free portions of the sheets wrapped around the animal in selective overlapping relation in accordance with the size of the animal to form a neck band near the head of the animal and a tight confining wrap around the body. Flap covered openings are disposed at spaced locations to permit access to the body of the animal for treatment. As with the '701 Patent, the mouth of the animal is unshielded.

None of the prior art provides an animal restraining device which provides for easy placement of the animal into a restrained orientation without exerting undesirable pressure on any particular portion of the body while allowing easy access to a plurality of locations on the body yet minimizing the risk of scratching or biting. Thus, there exists a need for an improved animal restraining device having a design which is simple, cheap to manufacture, easy to use, and can be adapted for a variety of animal types and sizes.

SUMMARY OF THE INVENTION

In accordance with the present invention, it is an object thereof to provide an animal restraining device which provides for easy insertion and secure retention of the animal during testing without harm.

It is a further object of the present invention to provide an animal restraining device which provides access to a plurality of locations on the body of the animal.

It is yet another object of the present invention to provide an animal restraining device which provides a rapid and effective means of restraining the animal without risk to the experimenter of being bitten or scratched by the animal.

It is still another object of the present invention to provide an animal restraining device which neither applies pressure, squeezes nor stretches any one part of the animal during retention thereof.

It is yet another object of the present invention to provide an animal restraining device which enables the experimenter to have freedom of movement during the testing procedure.

It is another object of the present invention to provide an animal restraining device which is simple, cheap to manufacture, easy to use and adaptable to a variety of animal types and sizes.

It is still another object of the present invention to provide a method for restraining an animal to be tested using the animal restraining device described above.

In accordance with the above objects and additional objects that will become apparent hereinafter, the present invention provides an animal restraining device, comprising:

a tube having a longitudinal extent and defining a first end, second end and interior chamber, the tube constructed and arranged for receiving a portion of the animal within the interior chamber to restrain the animal, the tube defining a peripheral wall and at least one aperture in the peripheral wall to enable access to the body of the animal restrained in the tube.

In one embodiment, the animal restraining device includes a generally elongated slit extending along the longitudinal extent of the tube, the slit sized and shaped to hold a portion of drawn skin from the animal when the body of the animal is disposed within the tube. In another embodiment, the peripheral wall of the tube comprises a plurality of apertures at spaced locations in the peripheral wall to facilitate access to a plurality of locations on the body of the animal.

As the animal is typically inserted head first into the tube to shield the mouth, one of the first and second ends of the tube has a wall defining an aperture through the wall to permit air to pass therethrough.

The invention also provides a method of restraining an animal to be tested, comprising the steps of:

(a) drawing a portion of skin from the animal;

(b) advancing the animal into a tube having a generally elongated slit extending along the longitudinal extent of the tube, the slit sized and shaped to hold the portion of drawn skin from the animal when the body of the animal is restrained within the tube; and (c) implementing testing or examination of the animal.

BRIEF DESCRIPTION OF THE DRAWINGS

In accordance with the above objects and additional objects that will become apparent hereinafter, the present invention will now be described with particular reference to the accompanying drawings.

DETAILED DESCRIPTION OF THE PREFERRED EMBODIMENTS

Figure 1:
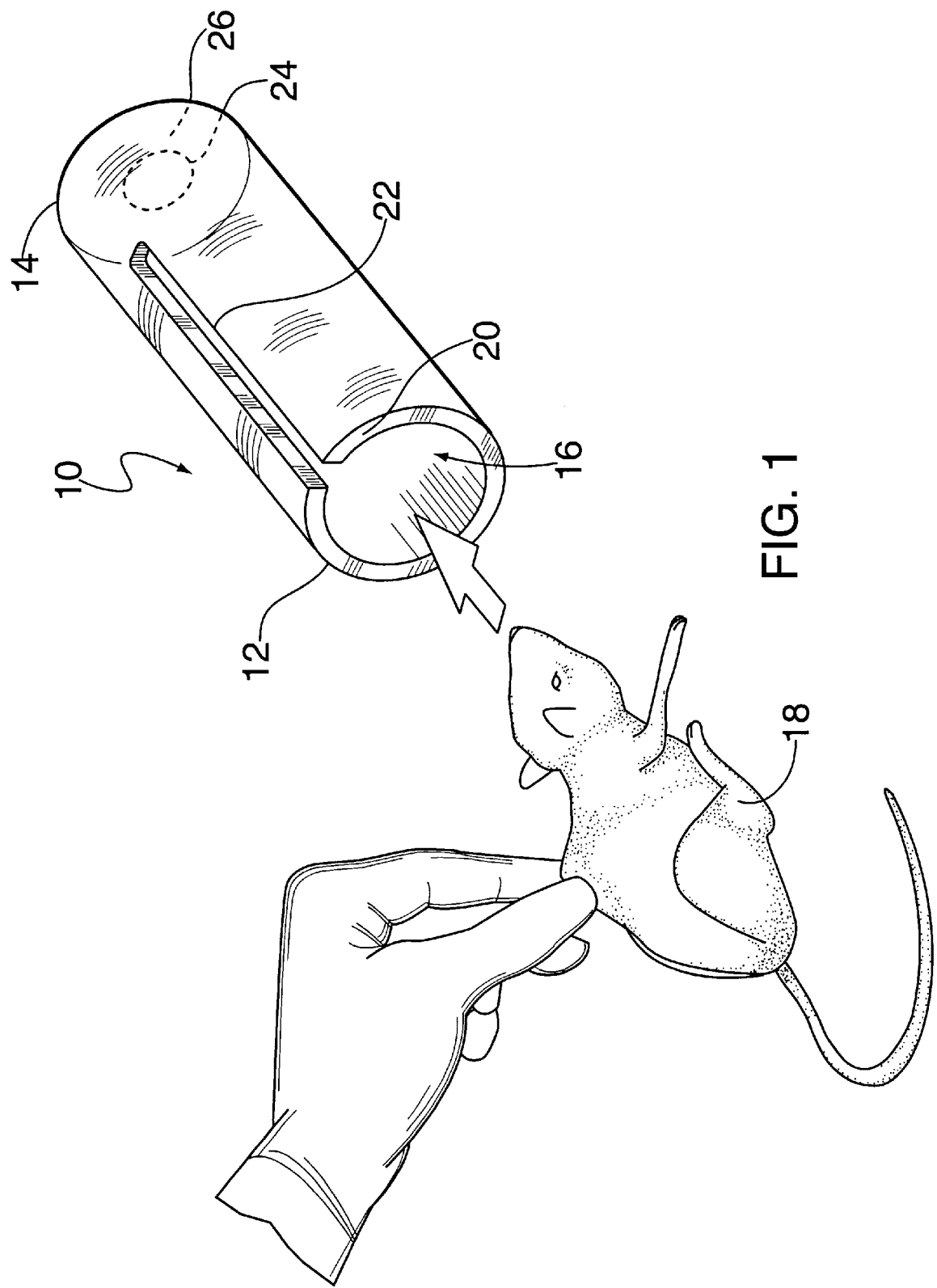
FIG. 1 is an exploded isometric view of the animal restraining device in a first embodiment in accordance with the present invention and an animal prior to insertion therein.
Figure 2:
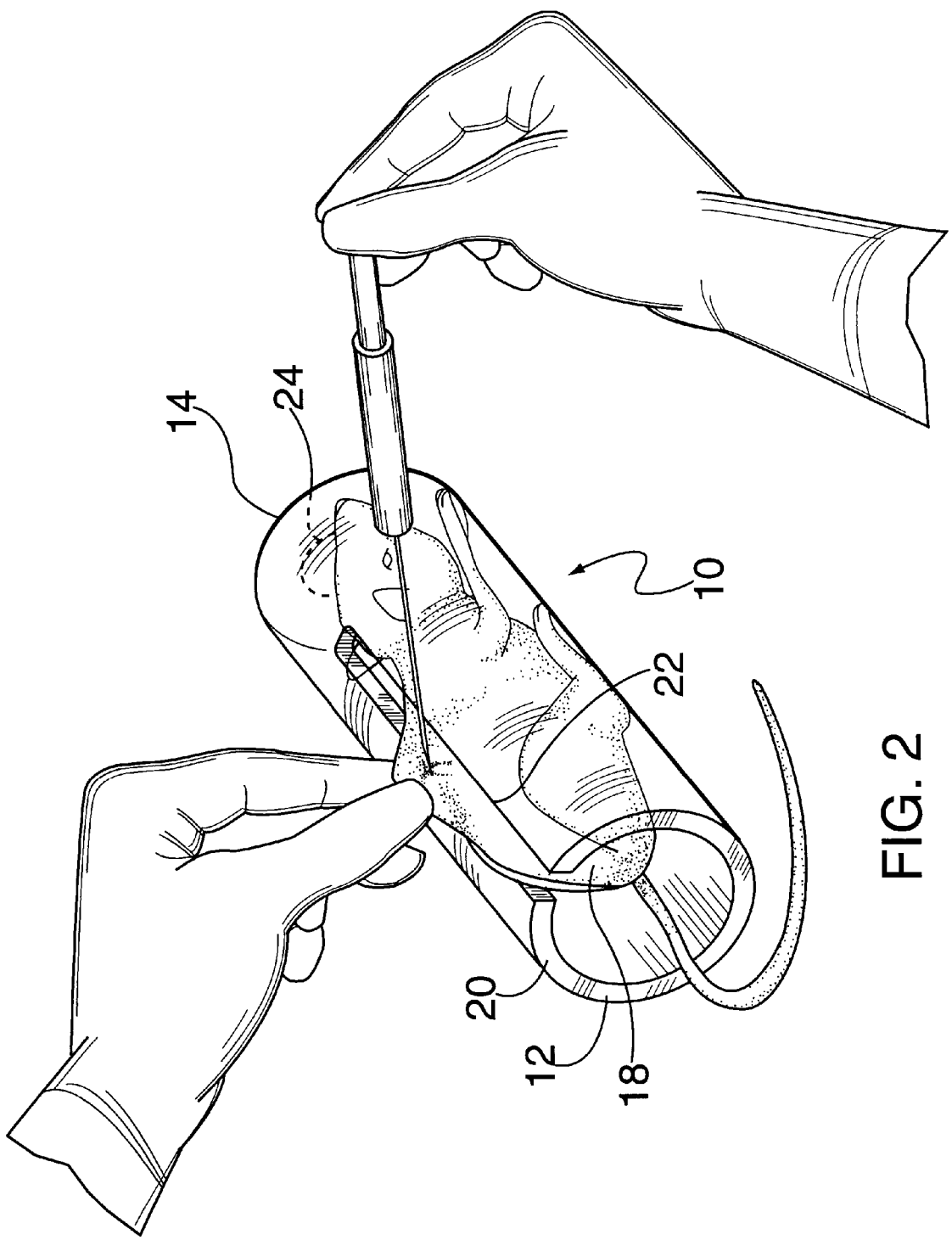
FIG. 2 is an isometric view of the animal restraining device with the animal restrained therein.

With reference now to the several views of the drawings, there is depicted an animal restraining device (hereinafter the "ARD") generally characterized by the reference numeral 10 and, as shown in FIGS. 1–4, comprised of a tube 10 having a longitudinal extent and defining a first end 12, second end 14 and interior chamber 16. The tube 10 is constructed and arranged for receiving a portion of an animal 18 (in the exemplary application—a rodent) within interior chamber 16. The tube defines a peripheral wall 20 and at least one aperture 22 in peripheral wall 20 to enable access to the body of animal 18 restrained in tube 10. The tube 10 may be fabricated from molded plastic, glass (either clear or opaque) or metal. The first end 12 is referred to as the "entrance portal," through which animal 18 is introduced into chamber 16. As shown in FIG. 2, animal 18 may be fully inserted into chamber 16 such that the mouth is shielded by the tube structure to prevent inadvertent biting of test personnel. In this connection, an air portal 24 is defined through wall 26 disposed at second end 14 to permit animal 18 to freely breath when restrained. The tube diameter is selected to suit the particular application, with the depicted embodiment for a rodent being only illustrative. It is anticipated that this construction may be used for much larger animals with the tube geometry, i.e., length, diameter, wall thickness, etc., being appropriately sized. The tube 10 can be configured to accept a variety of animals—anything from those of relatively small size (e.g., rodents, as shown) to larger animals, including cats, dogs and the like. Although shown in the preferred embodiment as a cylindrical tube, tube 10 may be fabricated in other shapes if desired within the scope of the invention.

Figure 3:
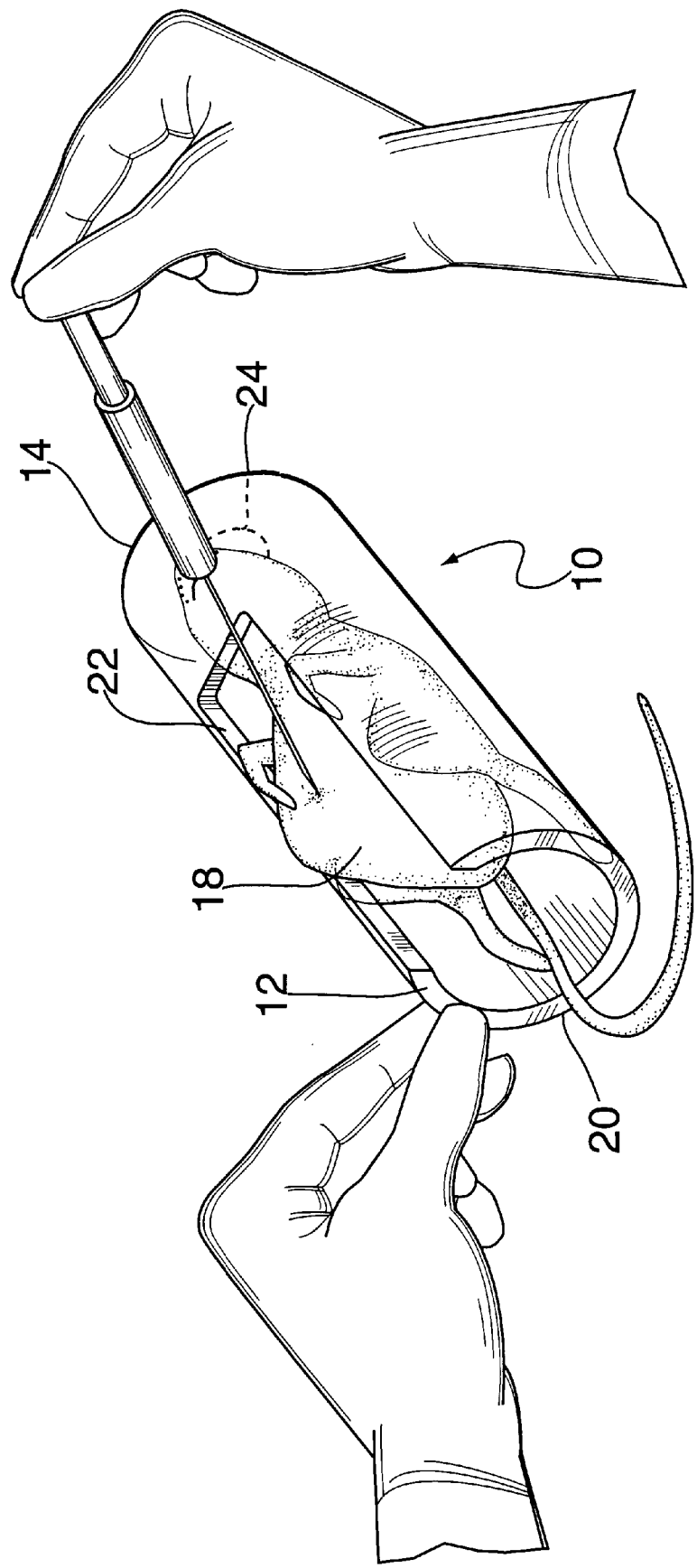
FIG. 3 is an isometric view thereof in a second embodiment.

In the embodiments of FIGS. 1–5, aperture 22 formed in peripheral wall 20 is a generally elongated slit extending along the longitudinal extent of tube 10. The slit 22 is sized and shaped to hold a portion of drawn skin from animal 18 when the body of animal 18 is disposed within tube 10. The slit is preferably located such that it extends from the entrance portal at first side 12 to about half the length of tube 10. The slit 22 may be made wide enough to facilitate easy access to the abdomen and lower portion of the trunk exposed in slit 22 as shown in FIG. 3. The animal 18 may be restrained by pulling enough of the soft truncal skin through slit 22, thereby freeing up both hands of the tester. If the slit 22 is relatively narrow (see FIG. 2), then the tester may have to hold animal 18 in place with one hand. In either embodiment, animal 18 is gently and painlessly placed with its head through the entrance portal in first side 12 and thereafter nudged forward. While the loose skin of the back is held between the fingers of one hand, the tester gently slides the body of animal 18 into tube 10 while the elevated area of skin is slid into slit 22. In this manner, the animal's head, upper trunk and feet are restrained, while gentle rotation of the soft truncal skin allows unobstructed access to the back, abdomen, and lower portion of the trunk exposed in slit 22. In the narrow slit arrangement shown in FIG. 2, the experimenter gently slides the body of animal 18 into tube 10 while gently pinching the dorsal skin such that this "fin" of tissue is slid into slit 22. In this manner, the animal's head, upper trunk and feet are restrained, while gentle rotation of the soft skin permits access to the back and abdominal skin. By folding this "fin" of skin over itself and the cylinder wall, precise and localized injections may be administered.

Figure 5:
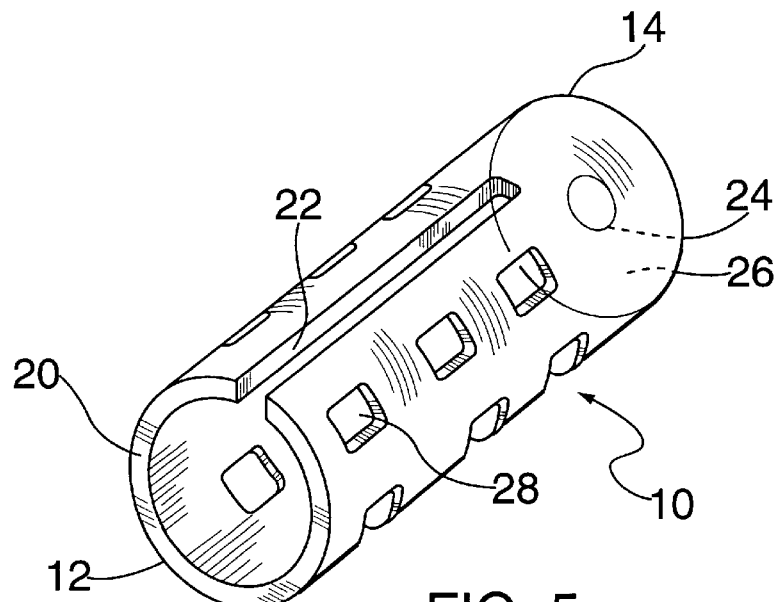
FIG. 5 is an isometric view of a third embodiment thereof.
Figure 4A:
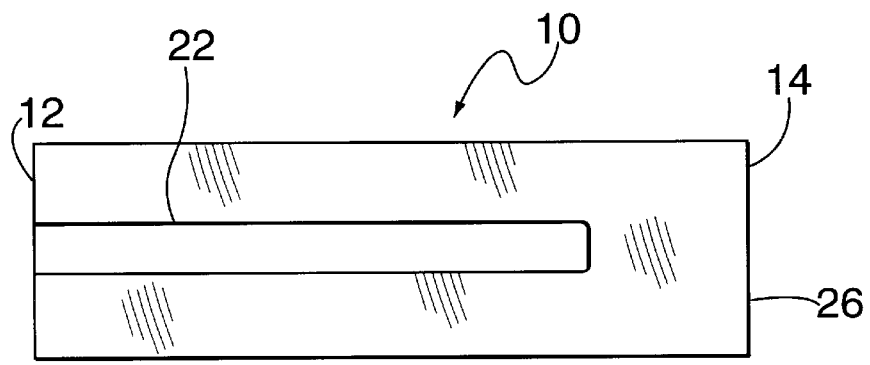
FIG. 4a is a front elevational view of the restraining device in the first embodiment.
Figure 4B:
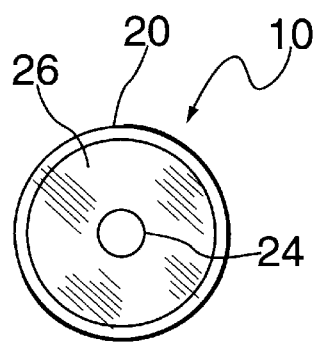
FIG. 4b is a side elevational view thereof.

Referring now to FIG. 5, an alternative embodiment of tube 10 is depicted in which a plurality of apertures 28 are defined in peripheral wall 20 to allow access to various locations of the body of animal 18 for injections and the like. The pattern of apertures 28 depicted in the drawings is exemplary as many arrangements can be employed within the scope of the invention.

In accordance with the ARD described above, the present invention also provides a method for restraining an animal to be tested, comprising the steps of:

(a) drawing a portion of skin from the animal 18;

(b) advancing animal 18 into a tube 10 having a generally elongated slit 22 extending along the longitudinal extent of the tube 10, the slit 22 sized and shaped to hold the portion of drawn skin from the animal 18 when the body of the animal 18 is disposed within the tube 10; and (c) implementing testing or examination of the animal 10.

In accordance with a particular embodiment, the present invention further provides a method of restraining an animal to be tested, comprising the steps of:

(a) drawing a portion of skin from the animal 18;

(b) advancing the animal 18 head-first into a tube 10 having an open end 12 sized to accept the animal 18 and a generally elongated slit 22 extending along the longitudinal extent of the tube 10, the slit 22 sized and shaped to hold the portion of drawn skin from the animal 18 when at least a portion of the body of the animal 18 is disposed within the tube 10; and (c) implementing testing or examination of the animal 18.

The present invention has been shown and described in what is considered to be the most practical and preferred embodiments. It is anticipated, however, that departures made by made therefrom and that obvious modifications will be implemented by persons skilled in the art.

What is claimed is:

1. A method of restraining an animal to be tested, comprising the steps of:

(a) drawing a portion of skin from the animal;

(b) advancing the animal into a tube having a generally elongated slit extending along the longitudinal extent of said tube, said slit holding the portion of drawn skin from the animal when at least a portion of the body of the animal is disposed within said tube; and (c) implementing testing or examination of the animal.

2. A method of restraining an animal to be tested, comprising the steps of:

(a) drawing a portion of skin from the animal;

(b) advancing the animal head-first into a tube having an open end sized to accept the animal and a generally elongated slit extending along the longitudinal extent of said tube, said slit holding the portion of drawn skin from the animal when at least a portion of the body of the animal is disposed within said tube; and (c) implementing testing or examination of the animal.

* * * * *